(12) United States Patent
Tsai et al.

(10) Patent No.: US 6,352,432 B1
(45) Date of Patent: Mar. 5, 2002

(54) KARAOKE APPARATUS

(75) Inventors: Tom Jen Tsai; Kanehisa Tsurumi, both of Hamamatsu; Satoshi Tachibana, Tokyo, all of (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/046,253

(22) Filed: Mar. 23, 1998

(30) Foreign Application Priority Data

Mar. 25, 1997 (JP) .............................. 9-071074

(51) Int. Cl.[7] .............................. G09B 5/00; G10H 7/00; A63H 5/00
(52) U.S. Cl. .............................. 434/307 A; 434/307 R; 84/610; 273/454; 463/1
(58) Field of Search .............................. 434/307 R–309, 434/318, 365; 273/454; 84/609–615, 677 R, 630–634, 650; 369/53; 381/56, 63; 386/46; 382/103; 345/358; 348/77, 564; 704/209, 261; 463/1, 8

(56) References Cited

U.S. PATENT DOCUMENTS

| 5,395,123 A | * | 3/1995 | Kondo ..................... 273/454 |
| 5,621,182 A | * | 4/1997 | Matsumoto ................. 84/610 |
| 5,726,373 A | * | 3/1998 | Choi et al. ................. 84/609 |
| 5,804,752 A | * | 9/1998 | Sone et al. ................. 84/610 |
| 5,876,213 A | * | 3/1999 | Matsumoto ............. 434/307 A |
| 5,915,972 A | * | 6/1999 | Tada ..................... 434/307 A |
| 5,931,680 A | * | 8/1999 | Semba ................... 434/307 A |
| 6,160,899 A | * | 12/2000 | Lee et al. ................... 382/103 |

FOREIGN PATENT DOCUMENTS

| JP | 6038718 | 7/1981 |
| JP | 3119870 | 12/1991 |
| JP | 5035181 | 2/1993 |
| JP | 8166780 | 6/1996 |
| JP | 8-221088 | * 8/1996 |
| JP | 9-6373 | * 1/1997 |
| JP | 9-62281 | * 3/1997 |
| JP | 10-133669 | * 5/1998 |
| JP | 10-282978 | * 10/1998 |

* cited by examiner

Primary Examiner—Joe H. Cheng
(74) Attorney, Agent, or Firm—Pillsbury Winthrop LLP

(57) ABSTRACT

A karaoke apparatus is provided in which a plurality of singers can sing at a time and superiority/inferiority of singing voices can be matched. One karaoke music piece is performed, and two persons sing the music piece at a time by using different microphones. Singing voice signals input through the two microphones are respectively scored, and characters displayed on a screen are caused to fight based on the score results. If the point of the singer having microphone is higher, an animation in which character attacks character is displayed. If the singing point of microphone is higher, animation in which character attacks character is displayed.

9 Claims, 12 Drawing Sheets

KARAOKE APPARATUS

BACKGROUND OF THE INVENTION

1. Field of the Invention

This invention relates to a karaoke apparatus in which a plurality of singers can sing at a time by using a plurality of microphones for singing.

2. Background

A scoring function of converting a singing voice input through a microphone into a voice signal and scoring the karaoke singing voice based on the frequency, the volume, and the like of the voice signal is practically used. In recent years, also the following karaoke apparatus is practically used. In the karaoke apparatus, a singing voice of a user is scored by the scoring function and the point of the scoring is displayed, and, in addition, a game in which a story or the like develops in accordance with the point is implemented, so that the karaoke singing is more joyfully enjoyed.

If the scoring function is applied to a game, in many cases, a plurality of singers are requested to play a match because of the settings of the game. Even if a conventional karaoke apparatus includes a plurality of microphones, however, only a singing voice of one channel can be scored. For this reason, in a case where two persons sing at a time, points for respective persons cannot be scored and the points cannot be compared with each other at the time. The points for both persons can be obtained with a time difference corresponding to one karaoke music piece. Therefore, an upsurge of emotion in the game is disadvantageously reduced.

If a game is set in such a manner that a plurality of persons sing at a time and play a match, the singers sing a song by using individual microphones and the karaoke apparatus discriminates the singers (players of the game) by using the identification numbers of the microphones. In a parlor such as a karaoke box, however, a singer rarely checks which microphone the singer uses. In a case where a singer sings while the singer does not know which microphone the singer uses, or in a case where the singer sings with a wrong recognition of a microphone, the development of the game is disadvantageously wasted.

SUMMARY OF THE INVENTION

It is an object of the invention to provide a karaoke apparatus in which a plurality of singers can sing at a time and play a match, and a karaoke apparatus in which a plurality of microphones can be easily identified.

According to the first aspect of the invention, there is provided a karaoke apparatus including: a performing device which performs a karaoke music piece, a plurality of microphones for singing through which singing voices of individual singers are respectively input during a performance of the karaoke music piece; a scoring device which individually scores a plurality of singing voices input through the plurality of microphones for singing, for each predetermined performance section of the karaoke music piece; and a superiority/inferiority displaying device displaying which singing voice of a singer is superior during or immediately after a performance of the predetermined performance section, based on a score result of the scoring device.

According to the second aspect of the invention, the scoring device may score a singing voice on each of a plurality of factors including a frequency and a volume, and the superiority/inferiority displaying device may display superiority/inferiority of the singing voice for each of the factors in different display manners.

According to the third aspect of the invention, there is provided a karaoke apparatus which includes a plurality of microphones for singing, and displays evaluations of singing voices respectively input through the microphones for singing in a performance of a karaoke music piece, with respectively predetermined display contents, and a microphone identifying device which receives a voice signal from one of the microphones for singing before the performance of the karaoke music piece is started, and displays an identification indicative of display contents to which the one microphone through which the voice signal is input corresponds.

According to the fourth aspect of the invention, there is provided a karaoke apparatus which includes: a performing device which performs a karaoke music piece; a microphone for singing through which a singing voice of a singer is input during a performance of the karaoke music piece; an image displaying device which displays an image with a motion during the performance of the karaoke music piece; and a motion controlling device which controls the motion of the image in accordance with a singing voice input through the microphone for singing.

According to the fifth aspect of the invention, there is provided a karaoke apparatus which includes: a performing device which performs a karaoke music piece; a plurality of microphones for singing through which singing voices of individual singers are respectively input during a performance of the karaoke music piece; an image displaying device which displays a plurality of images with motions which respectively correspond to the plurality of microphones for singing, during the performance of the karaoke music piece; a scoring device which individually scores a plurality of singing voices input through the plurality of microphones for singing, for each predetermined performance section of the karaoke music piece; and a motion controlling device which controls motions of one or more of the images based on a score result of the scoring device.

In the karaoke apparatus of the first aspect of the invention, singing voices of different singers which are input through the plurality of microphones in a performance of a karaoke music piece are individually scored, thereby enabling a plurality of score results (points) to be calculated. The calculation of the points is performed for each predetermined performance section such as a phrase of a music piece. The plurality of points are compared with each other, and information of which singer's singing voice is superior is displayed in real time. In this way, a plurality of singers can play at a time a match related to superiority/inferiority of singing voices.

In the karaoke apparatus of the second aspect of the invention, the scoring is performed for each of the plurality of factors such as a frequency (a musical interval), a volume, and timing (a tempo feeling). The superiority/inferiority of the compared results is displayed in different display manners. Therefore, a plurality of singers can easily recognize their superior points and inferior points.

In a karaoke apparatus which displays evaluations of singing voices input through a plurality of microphones for singing in different display contents, it is required for each of a plurality of singers to know which microphone the singer uses. According to the third aspect of the invention, therefore, a voice is input through a microphone prior to a karaoke performance, and information indicative of the microphone through which the voice is input (the identification number of the microphone) is then displayed. Accordingly, the correspondence relationship between a singer and a microphone can be easily understood.

The invention is applicable also to a karaoke apparatus in which harmonization processing of different parts is conducted for voice signals input through a plurality of microphones for singing, or different display controls are conducted (for example, a character is moved) in response to the voice signals input through the respective microphones.

In the karaoke apparatus of the fourth aspect of the invention, the motion of an image displayed on a screen is controlled based on a voice input through a microphone for singing during a karaoke performance. An image of a character imitating a human being or the like may be used as the image. According to this configuration, the condition of singing is represented by the motion of the image and hence can be easily understood in a visual manner.

In the karaoke apparatus of the fifth aspect of the invention, singing voices input through the plurality of microphones for singing are individually scored and motions of the plurality of images are controlled in accordance with the score results. If characters playing a match are displayed, for example, an image having a higher score result is moved so as to attack the opponent. Therefore, it is possible to visually know which singer is superior, on the basis of the motions of the images.

DETAILED DESCRIPTION OF THE PREFERRED EMBODIMENTS

A karaoke apparatus which is an embodiment of the invention will be described with reference to the drawings. The karaoke apparatus is a sound source karaoke apparatus in which music-piece data are read out and then supplied to a sound source, thereby forming musical tones of a karaoke performance. The music-piece data includes a guide melody data. The karaoke apparatus reads the guide melody data in parallel to the karaoke performance. The karaoke apparatus has a scoring function of scoring a singing voice by comparing a singing voice signal input through a microphone with the guide melody data. The karaoke apparatus includes two microphones for singing, and can individually score singing voice signals which are input through the respective microphones, and further, the karaoke apparatus has a game function of implementing a scoring game in which the singing of a karaoke music piece is treated as a game by using the scoring function for two channels. The scoring game is implemented by a scoring game ICM data which is an ICM data for executing functions other than a karaoke performance in the karaoke apparatus.

Both of the music-piece data for executing the karaoke performance and the ICM data are identified by a music-piece number. The music-piece data are identified by a six-digit music-piece number consisting of a four-digit singer number and a two-digit music-piece number for each singer. The ICM data also is identified by a six-digit number. For example, a music-piece number of 8000-01 is assigned to the above-mentioned scoring game ICM data. Accordingly, a karaoke user can select the scoring game by the same operation as an operation for selecting a karaoke music piece with using a remote controller or the like, and can instruct the start/finish of the game.

When the user inputs a music-piece number through a remote controller, the karaoke apparatus registers the music-piece number into a reservation list, and performs music pieces in the order in which they are registered. When the number of 8000-01 which is the number of the scoring game ICM data is input, the karaoke apparatus automatically treats the number as a priority interrupt reservation, and registers the number in the top position of the reservation list. When the music piece which is being performed at that time is finished, the scoring game ICM data is executed prior to the other reserved music pieces.

Figure 13A:
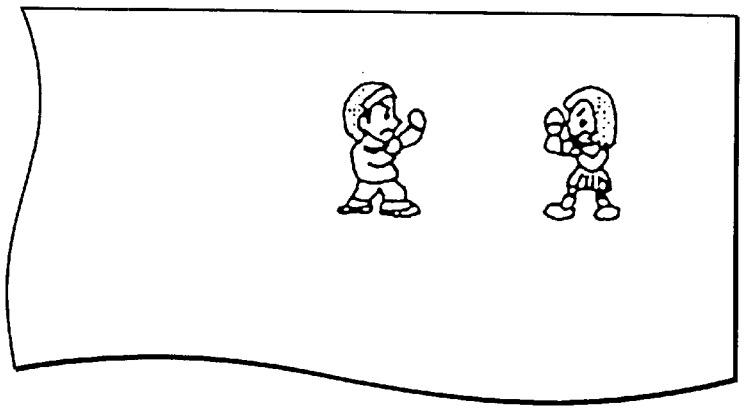
FIGS. 13A to 13C each illustrates a diagram showing another example of the display of a monitor of the karaoke apparatus.
Figure 13B:
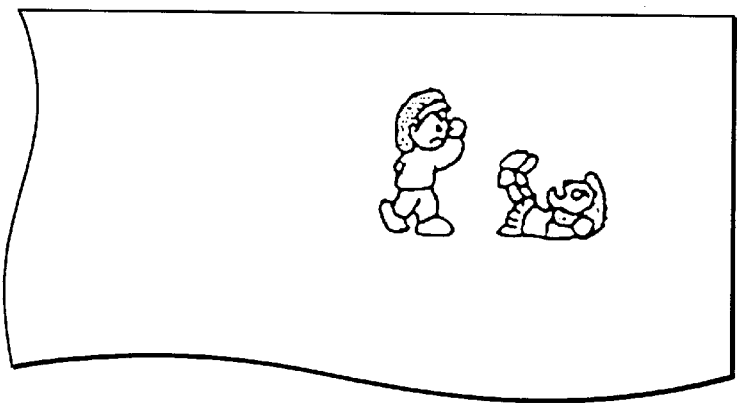
Figure 13C:
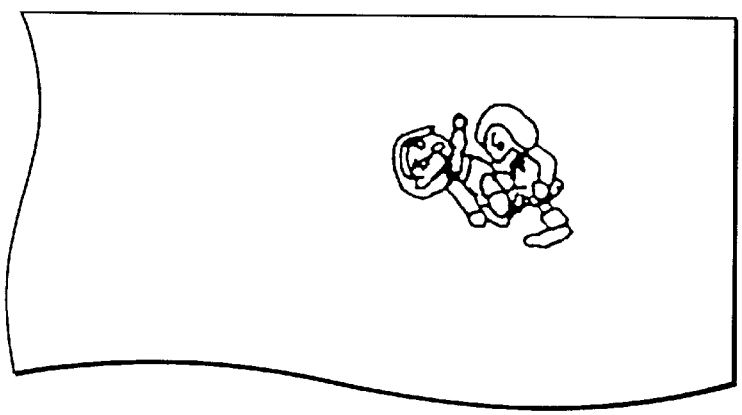

When the scoring game ICM data having the music piece number of 8000-01 is executed, a game selection screen is first displayed. The scoring game ICM data has a function of selectively implementing a plurality of scoring games. The user can select one from the games. One of the games is a karaoke battle game which will be described below in detail. When the karaoke battle game is selected, the karaoke apparatus reads a script data and an image data for implementing the game from the scoring game ICM data, and stores the read data into a RAM. Then, the karaoke apparatus returns to the usual karaoke performing operation. In the scoring game, the scoring is conducted on the singing voice of a singer while the karaoke music piece selected by the user is performed. The game is advanced in accordance with the point. The karaoke battle game is a game in which two characters displayed on a screen battle in accordance with the points of two singers (see FIGS. 13A to 13C). The two singers are in charge of the respective characters, and the character of the singer who gets a higher point attacks the other character with a trick.

The scoring of the karaoke singing voice is conducted on three factors of a frequency (a musical interval), a volume, and a rhythm. In addition, also a total point of the three factors is calculated. The points are calculated for each phrase of a karaoke music piece. In the karaoke battle game, the four kinds of points, i.e., the frequency points, the volume points, the rhythm points, and the total points for two persons are compared for each phrase. One who gets a higher point serves a trick on the other. Accordingly, four tricks can be served at the maximum in one phrase. Different types of tricks are assigned to the respective factors. For example, a punch, a kick, a tripping-up trick, and a throwing trick are assigned to the frequency, the volume, the rhythm, and the total point, respectively.

At the end of a music piece, the scoring function calculates the total point for the whole music piece which is obtained by summing points for respective phrases or averaging the points. At the end of the karaoke battle game, the total point for the whole music piece is displayed as a singing voice score result.

Figure 1:
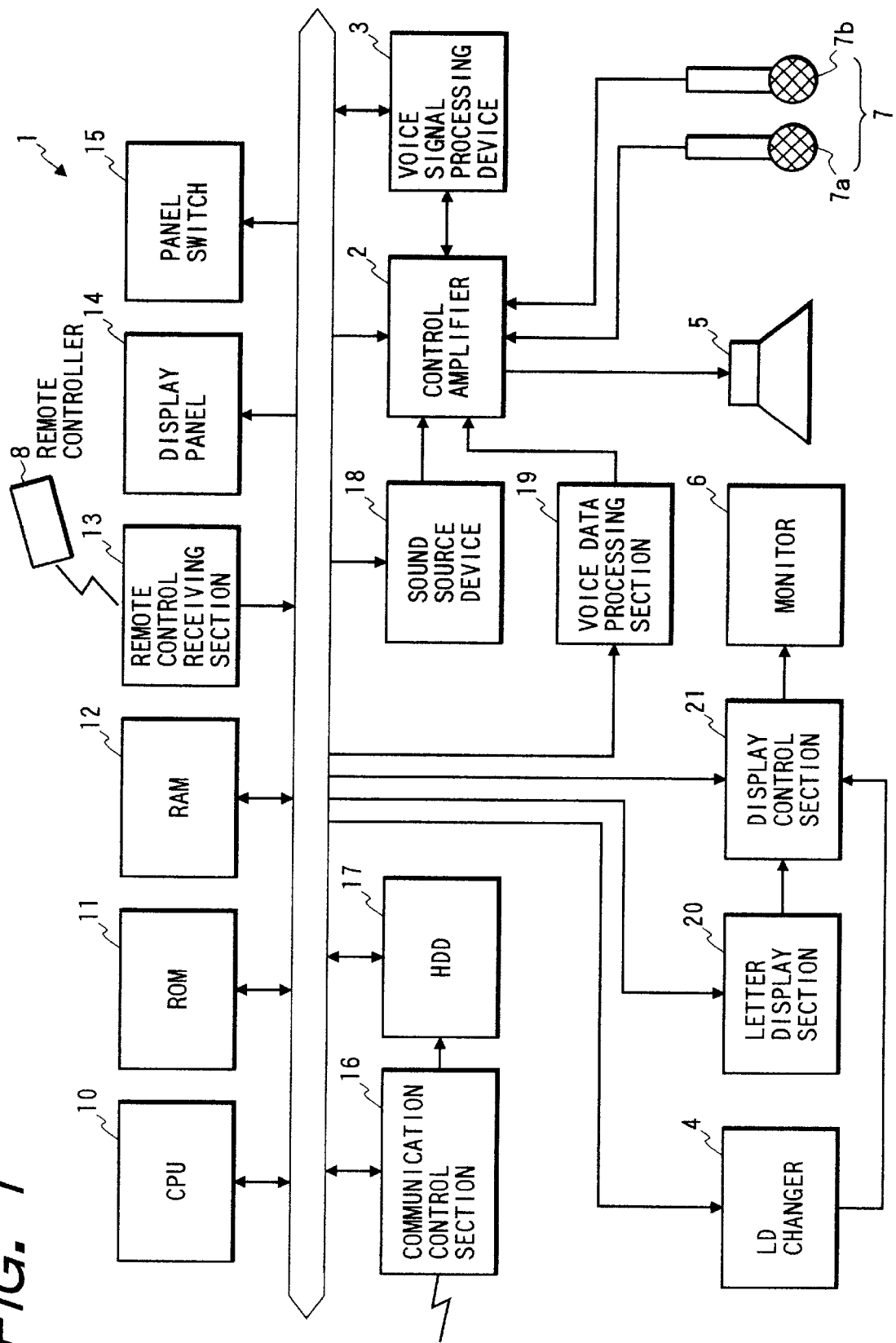
FIG. 1 is a block diagram of a karaoke apparatus which is an embodiment of the invention.
Figure 2:
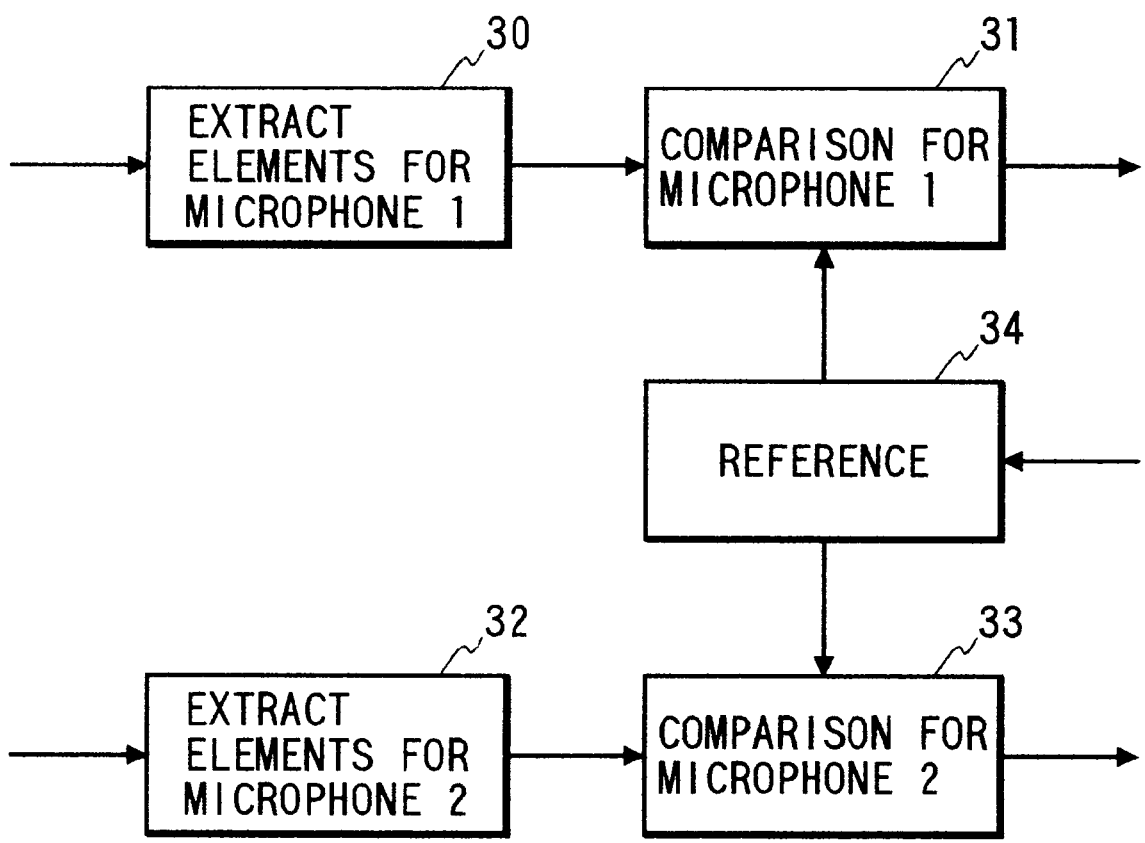
FIG. 2 is a functional block diagram of a voice signal processing device of the karaoke apparatus.

FIG. 1 is a block diagram of a karaoke apparatus which is an embodiment of the invention for implementing the above-described game function. FIG. 2 is a functional block diagram of a voice signal processing device 3 of the karaoke apparatus. The karaoke apparatus includes a karaoke apparatus main unit 1, a control amplifier 2, the voice signal processing device 3, an LD changer 4, a loudspeaker 5, a monitor 6, microphones 7 (7a and 7b), and an infrared remote controller 8. The karaoke apparatus main unit 1 controls the operation of the whole of the karaoke apparatus. A CPU 10 which is incorporated in the karaoke apparatus main unit 1, is connected via an internal bus to a ROM 11, a RAM 12, a hard disk storage device 17, a communication control section 16, a remote control receiving section 13, a display panel 14, a panel switch 15, a sound source device 18, a voice data processing section 19, a letter display section 20, and a display control section 21. The CPU 10 is connected via an interface also to the control amplifier 2, the voice signal processing device 3, and the LD changer 4 which function as external devices.

The ROM 11 stores an activation program required for activating the apparatus, and the like. System programs for controlling the operation of the apparatus, application programs, and the like are stored in the hard disk storage device 17. The application programs include a karaoke performance program, an ICM implementing program, and the like. When the karaoke apparatus is powered on, the system programs and the karaoke performance program are read into the RAM 12 in accordance with the above-mentioned activation program. The hard disk storage device 17 stores, in addition to the system programs and the application programs, music-piece data for karaoke performance for about ten thousand of music pieces, ICM data for implementing the scoring game function, and the like.

The communication control section 16 downloads music-piece data and the like from a data distribution center via an ISDN line, and writes the data into the hard disk storage device 17. The writing operation is directly conducted on the hard disk storage device 17 by using a DMA circuit.

The remote controller 8 has key switches such as numeric keys. When the user operates these switches, a code signal in accordance with the operation is output in the form of infrared rays. The remote control receiving section 13 receives the infrared signal transmitted from the remote controller 8, restores the code signal, and inputs the signal into the CPU 10. When a music-piece number is input through the remote controller 8, the CPU 10 registers the music-piece number into the reservation list which is set in the RAM 12.

The display panel 14 is disposed in the front face of the karaoke apparatus main unit 1. The display panel 14 includes a matrix display device for displaying the music-piece number which is now being performed, and the number of reserved music pieces, and an LED group for displaying a key and a tempo which are currently set. The panel switch 15 includes numeric keys for inputting a music-piece number which are the same as those of the remote controller 8, a key change switch, and a tempo change switch.

The sound source device 18 forms a musical-tone signal based on data in a musical-tone track of the music-piece data. The musical-tone track has a plurality of tracks. The sound source device 18 simultaneously forms musical-tone signals for a plurality of parts based on the data. The voice data processing section 19 forms a voice signal of designated duration and a designated pitch based on voice data included in the music-piece data. As for the voice data, a signal waveform which is difficult to be electronically formed such as a voice of a back chorus is directly stored in the form of a PCM signal. The musical-tone signals formed by the sound source device 18 and the voice signal reproduced by the voice data processing section 19 are input into the control amplifier 2. The two microphones 7a and 7b are connected to the control amplifier 2, so that singing voice signals of karaoke singers are input into the control amplifier 2. The control amplifier 2 imparts a predetermined effect such as an echo to each of these audio signals, and then amplifies the signals. The amplified signals are supplied to the loudspeaker 5.

FIG. 2 is a functional block diagram of the voice signal processing section. The voice signal processing section 3 has a DSP and processes the voice signal by digital processing based on a microprogram. The figure illustrates the function as a block diagram. A guide melody data which is read out of the music-piece data in the karaoke performance is input into the voice signal processing device 3 as a reference 34. The guide melody data is a MIDI data. The CPU 10 converts the MIDI event data into a frequency data and a volume data, and supplies the converted data to the voice signal processing device 3. Singing voice signals input through the two microphones, i.e., microphone 1 (the microphone 7a) and microphone 2 (the microphone 7b) are supplied from the control amplifier 2, and a singing frequency data and a singing volume data are extracted from the respective singing voice signal signals. The extracted singing frequency data and the singing volume data are compared with the reference 34 of the guide melody, thereby calculating points. The comparison processing is conducted for every 150 ms.

Alternatively, the voice signal processing device 3 may calculate difference data between the reference, and the singing frequency data and the singing volume data, and the CPU 10 may calculate points based on the difference data. In this case, the voice signal processing device 3 analyzes the frequency and the volume of the input singing voice signal, and produces a singing frequency data and a singing volume data. These data are compared with the frequency data and volume data of the guide melody input from the CPU 10, and difference data are calculated. The calculated frequency difference data and volume difference data are returned to the CPU 10. The CPU 10 accumulates the difference data which are input for every 150 ms. A rhythm difference data is obtained based on a deviation of rise timings of the singing volume data and the volume data of the guide melody, and the data also is accumulated. The accumulation is obtained for every phrase of a karaoke music piece, and a frequency point, a volume point, and a rhythm point are calculated. Each of the points is calculated by subtracting a demerit point based on the accumulation of the difference data from a perfect score. The point which is thus calculated for each phrase is accumulatively stored. At the end of the karaoke music piece, the accumulatively stored points are summed up to calculate the whole-piece point. The whole-piece point is separately calculated for each of the three factors of the frequency, the volume, and the rhythm.

The letter display section 20 generates a letter pattern such as a title and words of a music piece based on input letter data. The LD changer 4 which is an external device reproduces a moving picture as a background picture based on a picture selection data supplied from the CPU 10. The picture selection data is determined based on a data such as a genre data written in the header of the music-piece data. The display control section 21 superimposes the letter pattern such as words of a music piece supplied from the letter display section 20, on the background picture supplied from the LD changer 4, and displays the synthesized picture and letters on the monitor 6. In the game mode, in addition to the background picture and the words, various kinds of characters and animation are input into the display control section 21, and the characters and animation are displayed on the monitor 6.

Figure 3:
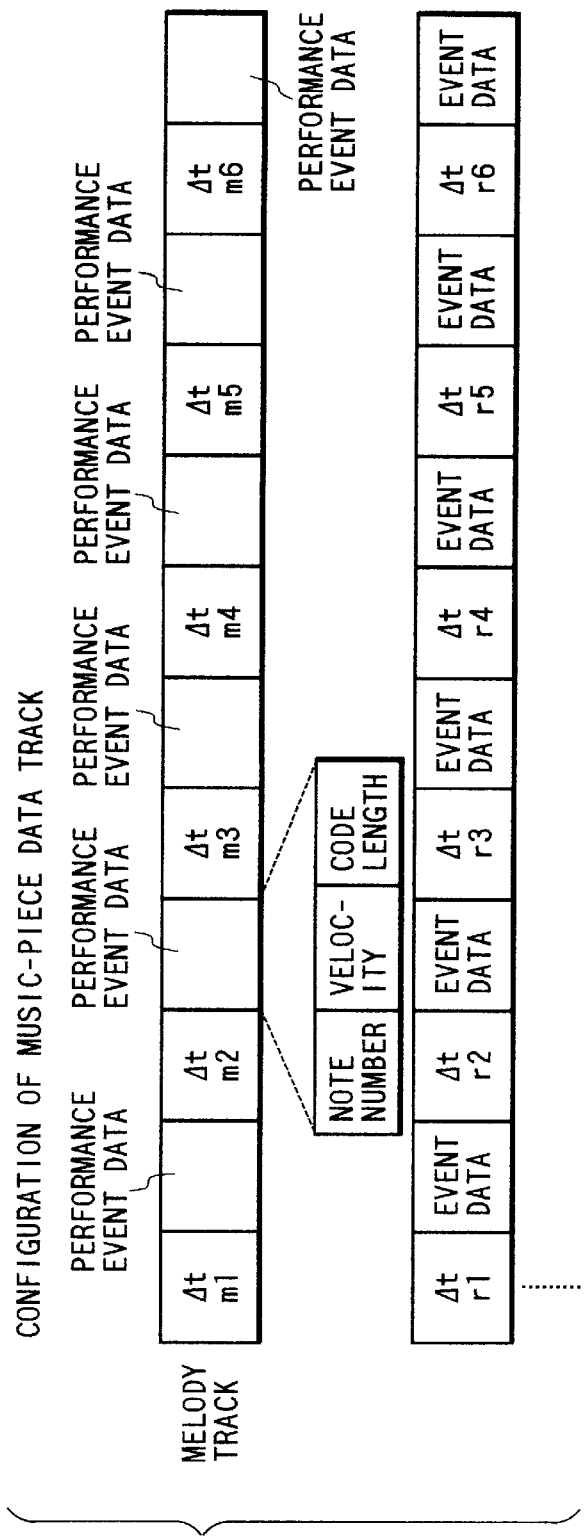
FIGS. 3A and 3B illustrate a diagram showing music-piece data used in the karaoke apparatus.

FIGS. 3A and 3B illustrate a diagram showing the configuration of a music-piece data used in the karaoke apparatus. The music-piece data includes a header, a musical-tone track, a guide melody track, a word track, a voice track, an effect track, and a voice data part. In the header, data related to attributions of the music-piece data is written. Namely, data such as a title of a music piece, a genre, a released date, and a performance time of the music piece are written in the header. The tracks ranging from the musical-tone track to the effect track are described in a MIDI format including a plurality of event data and duration data indicating a time interval between respective event data. The data ranging from the word track to the effect control track are not a musical-tone data, but, in order to facilitate an operation process by unifying implementation, these tracks also are described in the MIDI format.

The musical-tone track includes tracks for a plurality of parts for driving the sound source device 18 to form a plurality of musical-tone signals. A data of a melody of the karaoke music piece, that is, a melody to be sung by a singer is written in the guide melody track. The word track is a track in which sequence data for displaying the words on the monitor 6 are stored. The event data of the word track includes letter codes of the words and data indicating the display position of the letters, and the like. The voice control track is a track for designating a vocalization timing of a voice data group stored in the voice data part, etc. PCM data such as a human voice are stored in the voice data part. The event data of the voice control track designates a voice data which is to be reproduced at the event timing. In the effect control track, an effect control data for controlling the control amplifier 2 is written. The control amplifier 2 imparts echo-like effects such as reverberation to the musical-tone signal based on the effect control data.

The ICM data for implementing functions such as the scoring game has substantially the same configuration as that of the above-described music-piece data. The ICM data includes a header in which data such as a data name of the ICM data and a release date are written, a script data, a plurality of image data and text data groups used in the implementation of the script data, and the like. In the case of the scoring game ICM data, a script data track is set for each game such as a karaoke battle game. As image data, data for displaying a screen shown in FIGS. 12A and 12B or a character animation shown in FIGS. 13A to 13C, and the like are written.

Figure 6:
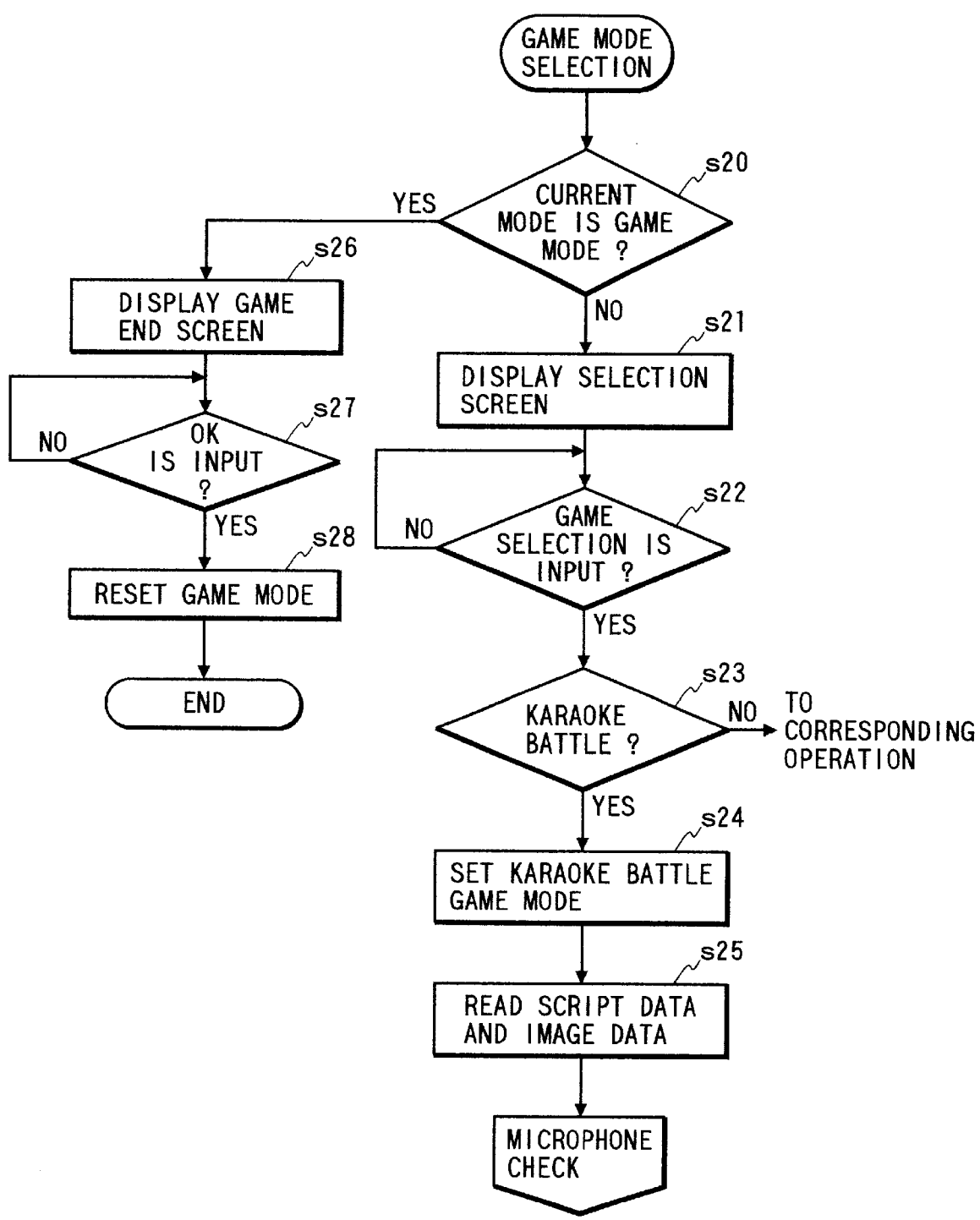
FIG. 6 is a flowchart showing the data read operation of the karaoke apparatus.
Figure 7:
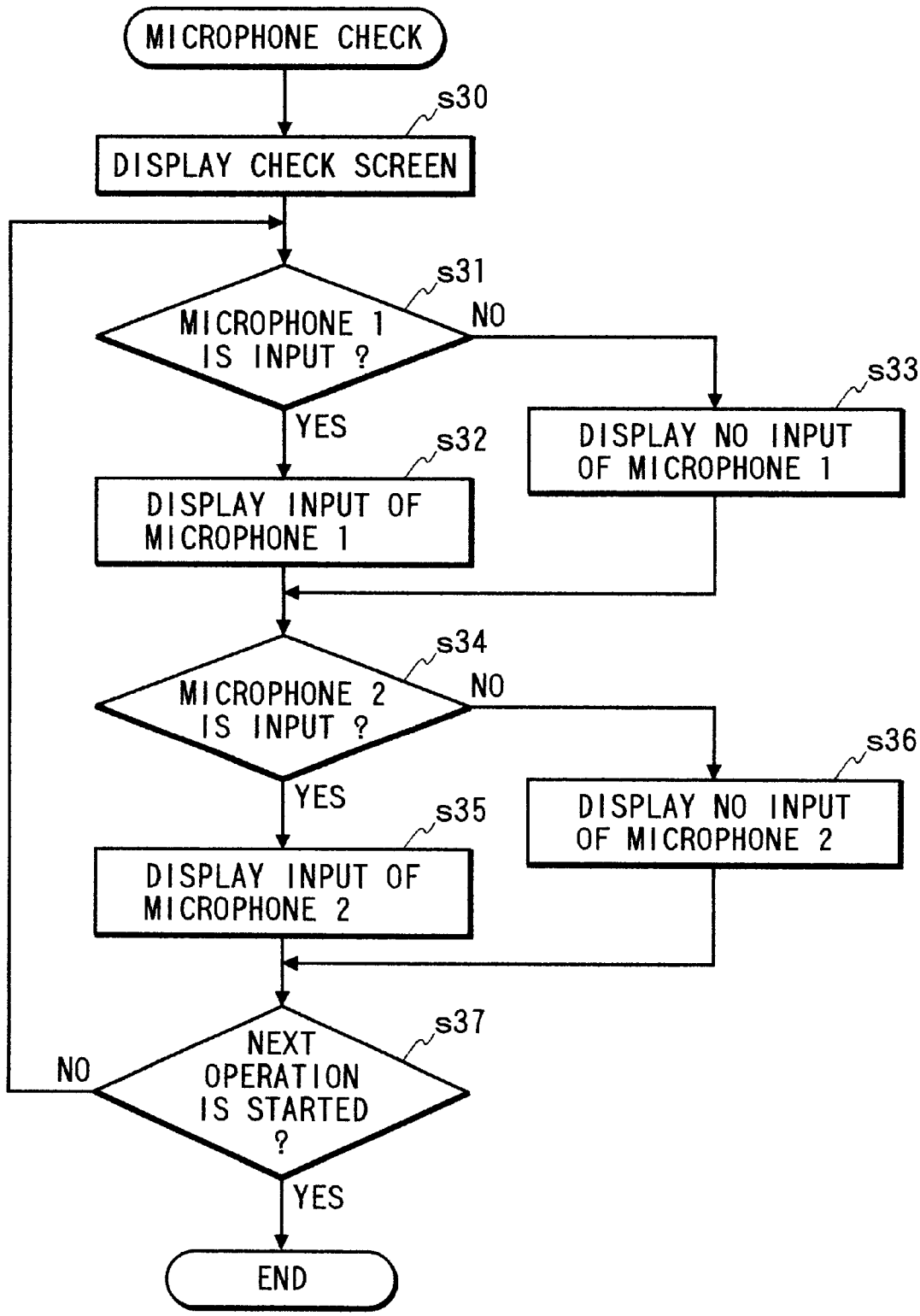
FIG. 7 is a flowchart showing the data read operation of the karaoke apparatus.
Figure 8:
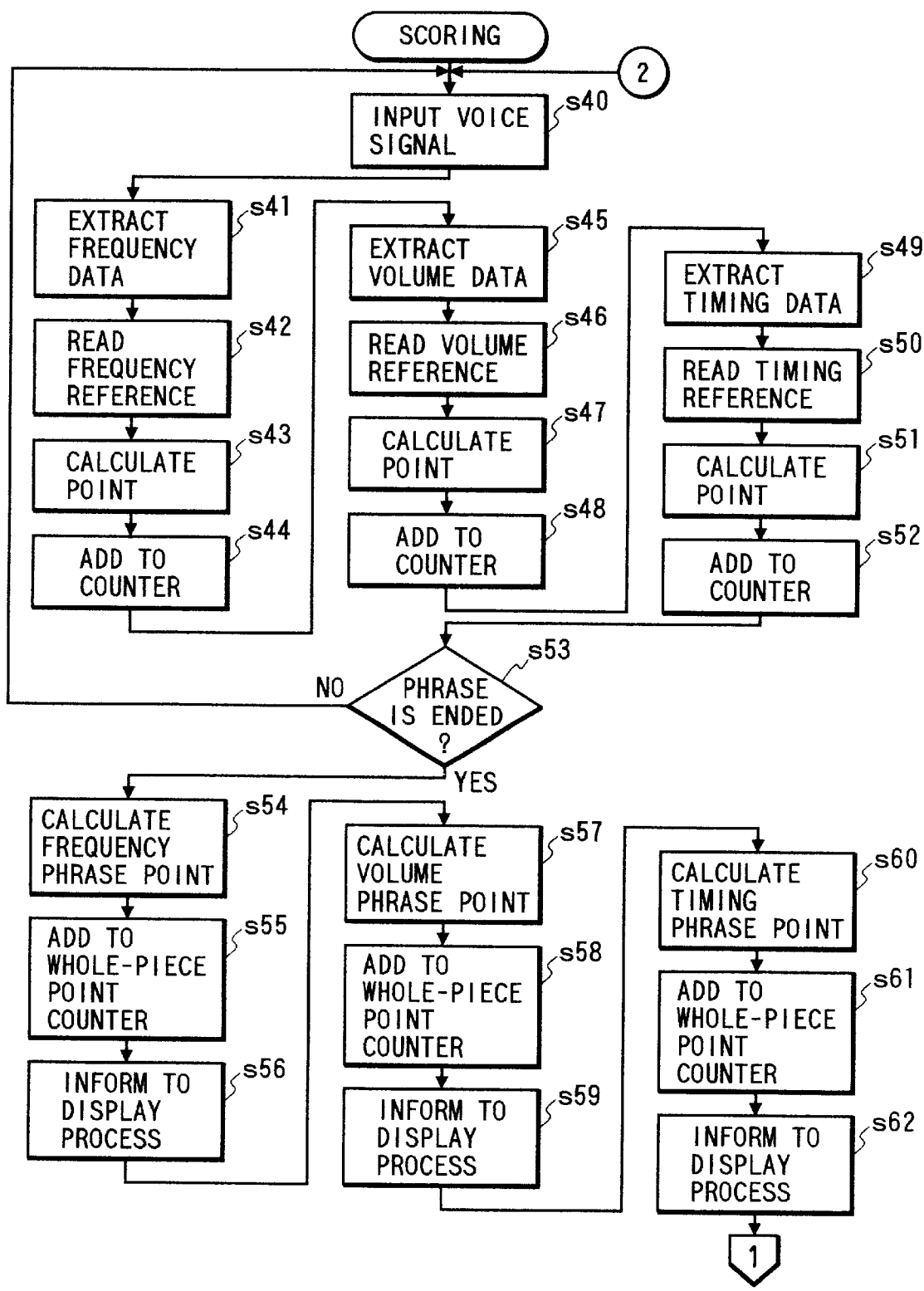
FIG. 8 is a flowchart showing a progress control operation of the karaoke apparatus.
Figure 9:
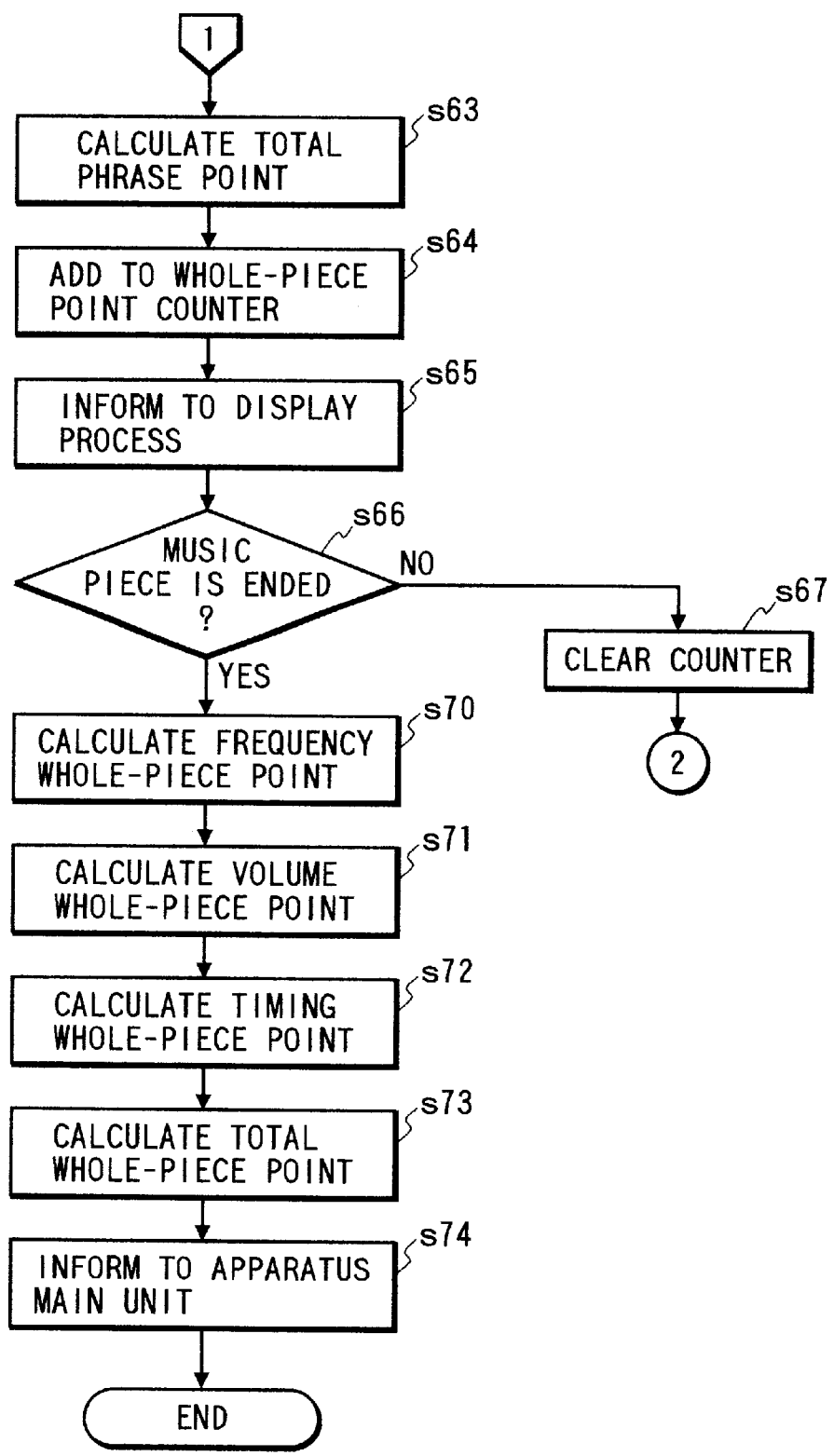
FIG. 9 is a flowchart showing the progress control operation of the karaoke apparatus.

FIGS. 4 to 11 are flowcharts illustrating the operation in the implementation of the karaoke battle game in the karaoke apparatus. A scoring processing operation in FIGS. 8 and 9 shows the operation of the voice signal processing device 3.

Figure 4:
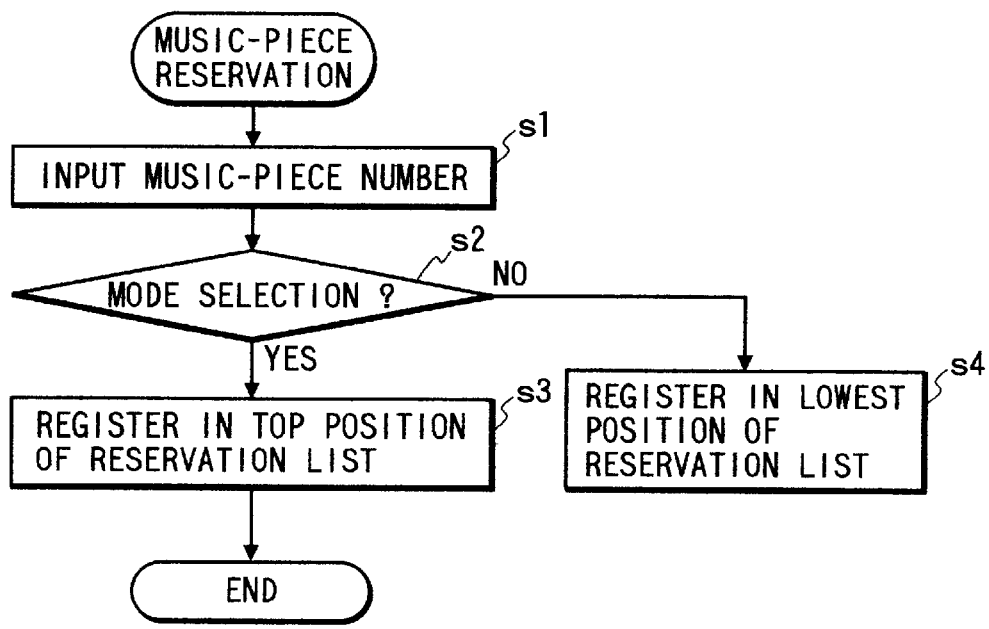
FIG. 4 is a flowchart showing a data read operation of the karaoke apparatus.

FIG. 4 is a flowchart illustrating a music-piece reserving operation. The operation is implemented when a music-piece number is input through the remote controller 8. When a music-piece number is input (s1), it is judged whether the music-piece number is the music-piece number of 8000-01 designating the scoring game ICM data for setting/releasing the scoring game mode or not (s2). If the music-piece number is 8000-01, the music-piece number is registered in the top position of the reservation list (s3). If the music-piece number is not 8000-01 or the number is a music-piece number designating a usual karaoke music piece, the music-piece number is registered in the lowest position of the reservation list. Registered numbers are sequentially read out in descending order. The performance of the karaoke music piece designated by the music-piece number, the processing of the ICM data, and the like are implemented.

Figure 5:
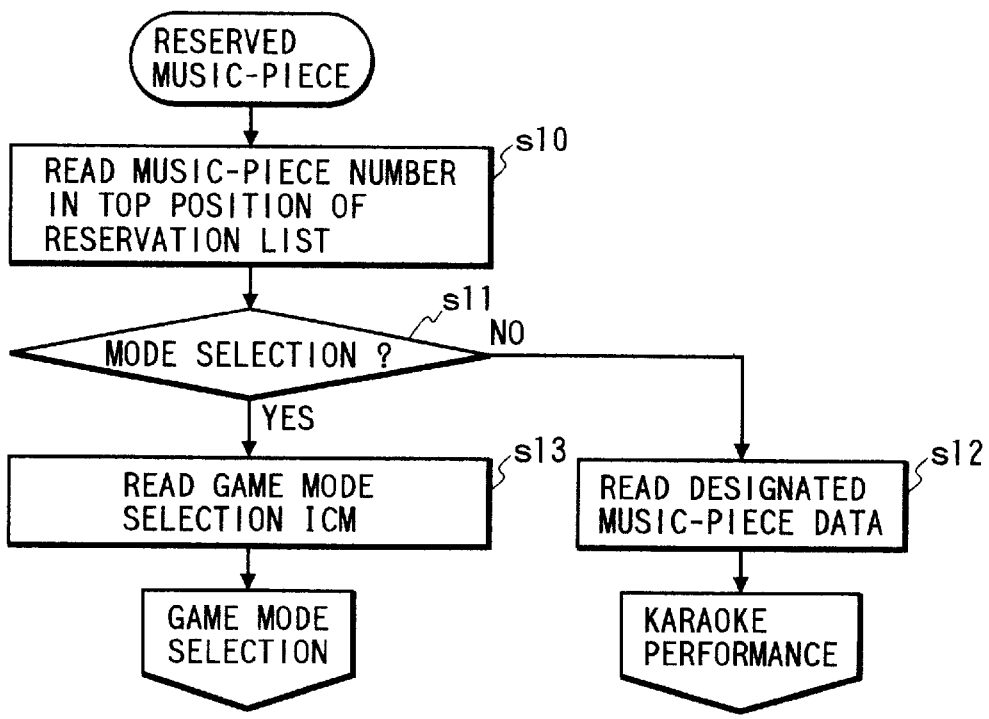
FIG. 5 is a flowchart showing the data read operation of the karaoke apparatus.
Figure 10:
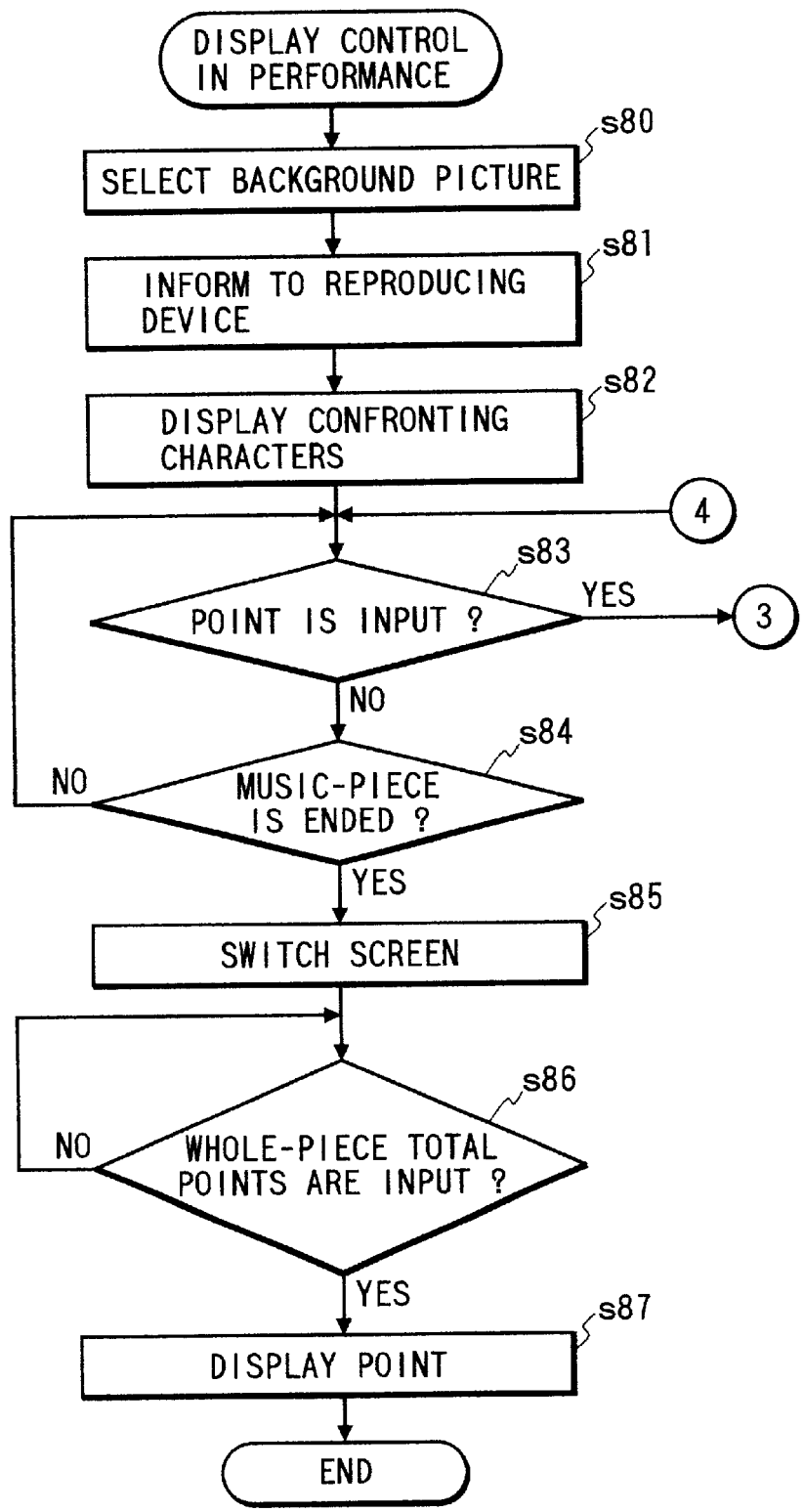
FIG. 10 is a flowchart showing a display control operation of the karaoke apparatus.
Figure 11:
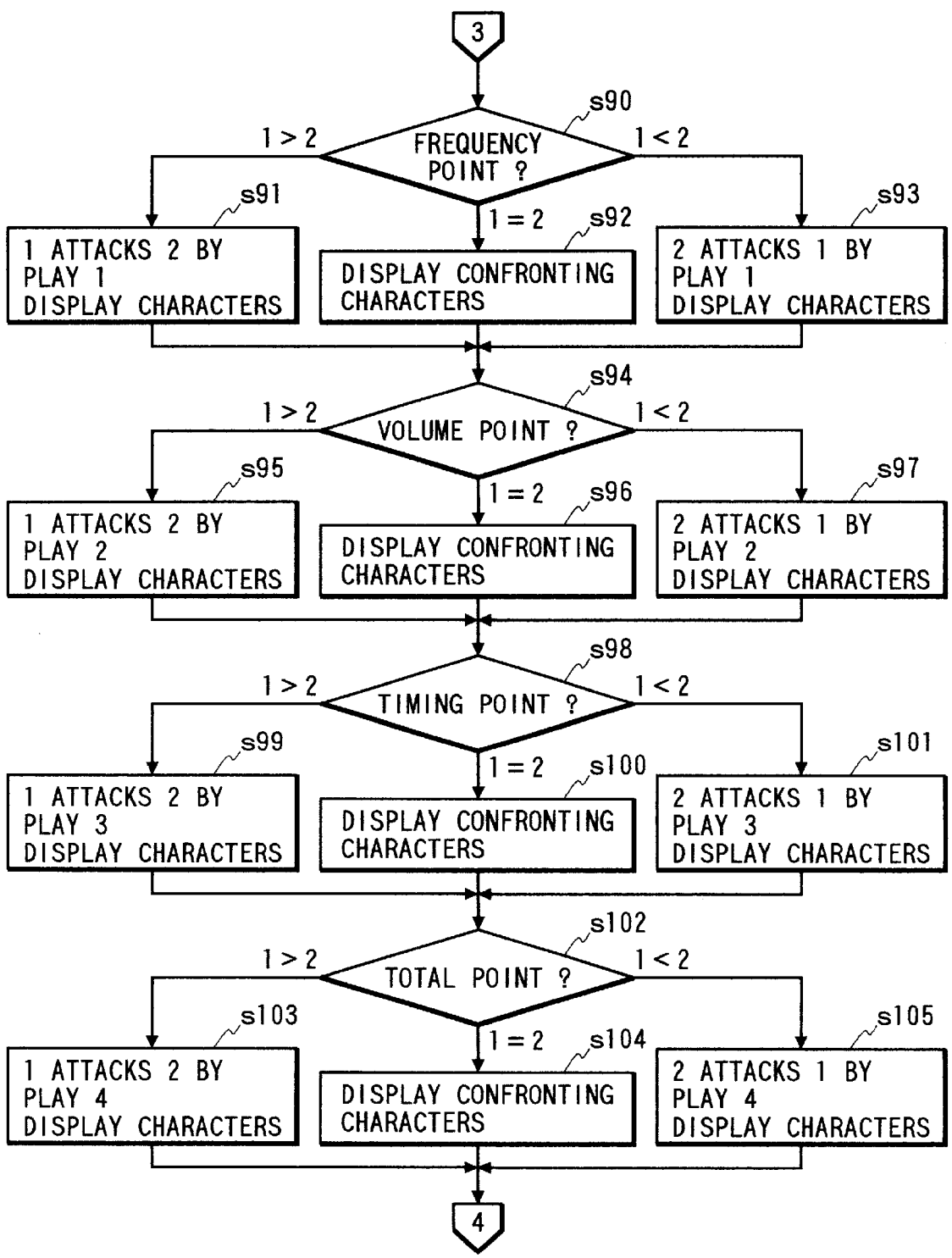
FIG. 11 is a flowchart showing the display control operation of the karaoke apparatus.

FIG. 5 is a flowchart illustrating a music-piece reservation processing operation. Every end of the performance of a karaoke music piece, the operation is implemented with reference to the above-mentioned reservation list. First, the music-piece number registered in the top position of the reservation list is read. It is judged whether the music-piece number is 8000-01 or not (s11). If the music-piece number is 8000-01, the game mode selection ICM data is read out (s13). Then, the process proceeds to a game mode selection operation (FIG. 6). If the music-piece number is a music-piece number designating a usual music-piece data, the designated music-piece data is read and the karaoke performance is implemented. In a usual mode, only the implementation processing of the karaoke performance including the generation of performance tones, the display of the background picture, and the like is performed based on the music-piece data. In the case where the game mode is set, in parallel to the karaoke performance, the scoring operation shown in FIG. 8 and the display control operation shown in FIGS. 10 and 11 are implemented.

FIG. 6 is a flowchart illustrating the game mode selection operation. The operation is implemented by the scoring game ICM data which is read out in step s13 of the above-described reservation processing operation. It is judged whether the game mode is currently set or not (s20). The implementation of the game mode selection operation under the condition that the game mode is set indicates the intention of finishing the game, and hence the process proceeds from step s20 to step s26. If the game mode is not set, the game mode selection operation is implemented in order to start the game, and the process proceeds from step s20 to step s21.

In step s21, a selection screen of games is displayed. In the selection screen, titles of all games which can be implemented by the scoring game ICM data are displayed. The user can select one of the games. In step s22, the process waits until the user inputs a game selection. The selection input is conducted by operating the remote controller 8. When one game is selected, it is judged in step s23 whether the game is a karaoke battle game or not. If the karaoke battle game is selected, the process proceeds to the operation of step s24 and the following steps. If any other game is selected, a corresponding operation which is not shown is implemented.

In step s24, a mode of the karaoke battle game is set in a game mode register, and the script data and image data used for implementing the game are read out. The read data are stored in a predetermined area of the RAM 12 (s25). Thereafter, the process proceeds to a microphone check operation (FIG. 7).

In the case where the game mode is currently set and the game mode selection operation is implemented in order to finish the game, a game end screen is displayed (s26). The game end screen is a screen including the words "The game XX ends. OK?," and the like. When the user inputs OK through the remote controller 8 in response to the display (s27), the contents of the game mode register are reset (s28) and the operation is terminated. When the game end screen is displayed and the user performs an operation other than OK, such as an operation of a cancel key, the operation is terminated without resetting the current game mode.

Figure 12A:
FIGS. 12A and 12B each illustrates a diagram showing an example of a display of a monitor of the karaoke apparatus.

FIG. 7 is a flowchart illustrating the microphone check operation. As described above, a person who sings with using microphone 1 (7a) is in charge of character 1, and another person who sings with using microphone 2 (7b) is in charge of character 2. Therefore, it is necessary to ascertain which microphone is used by each of the two persons. In order to facilitate the check, when a voice such as "Ah" is input through a microphone, a check result that the microphone through which the voice is input is microphone 1 or microphone 2 is displayed on the screen. When the karaoke battle game is selected, a screen of FIG. 12A is displayed on the monitor 6. The left character is character 1 of which the singer using microphone 1 is in charge. The right character is character 2 of which the singer using microphone 2 is in charge. This figure shows an example of the display in the case where a voice is input through microphone 1. A microphone icon displayed above character 1 is highlighted, and a numeral "1" indicating the microphone number is displayed in the icon. When a voice is input through microphone 2, a numeral "2" is displayed in a microphone icon above right character 2.

In the flowchart of FIG. 7, the screen of FIG. 12A is first displayed, and it is judged whether there is an input through microphone 1 or not (s31). When there is an input of a predetermined level or higher level through microphone 1, the input of microphone 1 is displayed as shown in FIG. 12A (s32). If there is no input through microphone 1, no input of microphone 1 is displayed (s33). In addition, the input level of microphone 2 is judged (s34). If there is an input of a predetermined level or higher level, the input of microphone 2 is displayed (s35). If there is no input through microphone 2, no input of microphone 2 is displayed in such a manner that the numeral in the microphone icon is deleted as shown in FIG. 12A (s36). The operation continues until the next karaoke performance is started. When the karaoke performance is started, the operation is terminated.

FIGS. 8 and 9 are flowcharts illustrating the scoring operation which is executed during the performance of a karaoke music piece. The operation is the processing which is to be executed by the voice signal processing device 3. In the figures, the factor extracting processing and the comparing processing shown in FIG. 2 are specifically shown. As for the operation, although only the operation for a voice signal input through one of the microphones is shown, the voice signal processing device 3 conducts the operation for two channels of singing voice signals input through microphones 1 and 2 in parallel.

First, a singing voice signal of the singer is input from the control amplifier 2 (s40), a frequency data is extracted from the singing voice signal (s41), and a frequency reference data input from the karaoke apparatus main unit 1 is read out (s42). These data are compared, so as to calculate a frequency point (s43), and the frequency point is added to a frequency point counter (s44). Next, a volume data is extracted from the input singing voice signal (s45), and a volume reference data input from the karaoke apparatus main unit 1 is read out (s46). These data are compared, so as to calculate a volume point (s47), and the volume point is added to a volume point counter (s48). In addition, a timing data is extracted based on the variation of the extracted volume data (s49), and a timing reference data is read out (s50). These data are compared, so as to calculate a timing point (s51), and the timing point is added to a timing point counter (s52). The operation is executed for every 150 ms during the performance of a karaoke music piece and repeatedly performed until the end of a phrase is detected (s53). A phrase is a separation of the melody of a music piece, and the end of a phrase can be detected on the basis of the volume of zero of the guide melody. A data indicating the separation of a phrase may be embedded in the music-piece data, so as to detect the separation of a phrase based on the embedded data.

When the end of a phrase is detected in step s53, a frequency phrase point, a volume phrase point, and a timing phrase point are calculated based on the count values of the frequency point counter, the volume point counter, and the timing point counter (s54, s57, and s60). Each of the phrase points is calculated by averaging the count value of the corresponding point counter by a time period of a phrase, or by other processing. The frequency phrase point, the volume phrase point, and the timing phrase point are respectively added to a frequency whole-piece point counter, a volume whole-piece point counter, and a timing whole-piece point counter (s55, s58, and s61), and the karaoke apparatus main unit 1 is informed of the phrase points (s56, s59, and s62). When the karaoke apparatus main unit 1 is informed of the phrase points for microphones 1 and 2, the karaoke apparatus main unit 1 executes animation processing in which character 1 or 2 plays a trick against the other, based on the magnitudes of the points.

Next, a total phrase point is calculated by averaging the frequency phrase point, the volume phrase point, and the timing phrase point (s63). The total phrase point is added to the total whole-piece point counter (s64). The karaoke apparatus main unit 1 is informed of the total phrase point (s65). When the karaoke apparatus main unit 1 is informed of the phrase points for microphones 1 and 2, the karaoke apparatus main unit 1 executes the animation processing in which character 1 or 2 plays a trick against the other, based on the magnitudes of the points.

Until the end of the karaoke music piece is detected in step s66, the frequency point counter, the volume point counter, and the timing point counter are cleared (s67), and the process returns to step s40. Then, the scoring operation for the next phrase is conducted.

Figure 12B:
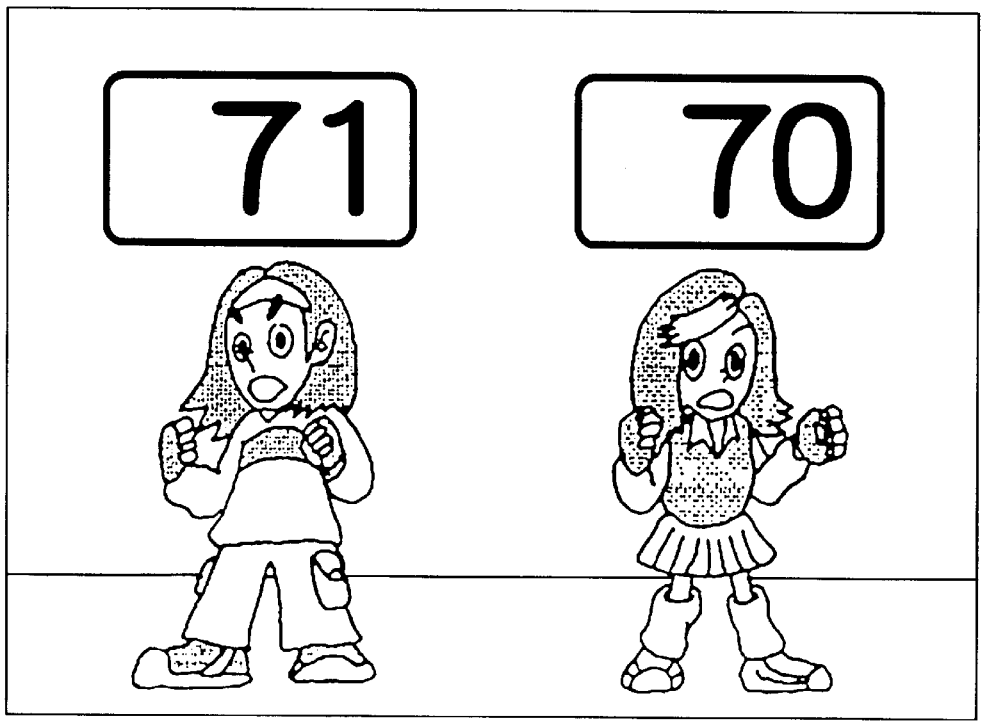

If the end of the karaoke music piece is detected in step s66, a frequency whole-piece point, a volume whole-piece point, a timing whole-piece point, and a total whole-piece point are obtained by calculating the count values of the frequency whole-piece point counter, the volume whole-piece point counter, the timing whole-piece point counter, and the total whole-piece point counter in terms of the perfect score of 100 points (s70, s71, s72, and s73). The karaoke apparatus main unit 1 is informed of the whole-piece points (s74). The karaoke apparatus main unit 1 displays the whole-piece points in a result display screen as shown in FIG. 12B.

FIGS. 10 and 11 are flowcharts illustrating the display control operation in the karaoke performance. When the music-piece data is read out and the performance of the karaoke music piece is to be started, a background picture is first selected based on the genre data written in the header of the music-piece data (s80). A reproducing device such as the LD changer 4 is informed of the selected data, so as to start the reproduction of the background picture (s81). Next, since there is no superiority/inferiority for characters 1 and 2 at the start of the game, a confronting character screen (see FIG. 13A) in which the characters glare at each other is displayed (s82).

When the phrase points are then input from the voice signal processing device 3, the process proceeds to step s90 in accordance with the result of a judgement in s83. In step s90, the frequency phrase points of microphones 1 and 2 are compared with each other. If the point of microphone 1 is higher than that of microphone 2, a character animation in which character 1 plays trick 1 (punch or the like) corresponding to the frequency point to character 2 is displayed (s91, see FIG. 13B). By contrast, if the point of microphone 2 is higher than that of microphone 1, a character animation in which character 2 plays trick 1 corresponding to the frequency point to character 1 is displayed (s93, see FIG. 13C). In the case where the point of microphone 1 is substantially equal to that of microphone 2, the confronting character screen in which characters 1 and 2 glare at each other is displayed (s92, see FIG. 13A).

Next, in step s94, the volume phrase points of microphones 1 and 2 are compared with each other. If the point of microphone 1 is higher than that of microphone 2, a character animation in which character 1 plays trick 2 (kick or the like) corresponding to the volume point to character 2 is displayed (s95). By contrast, if the point of microphone 2 is higher than that of microphone 1, a character animation in which character 2 plays trick 2 corresponding to the volume point to character 1 is displayed (s97). In the case where the point of microphone 1 is substantially equal to that of microphone 2, the confronting character screen in which characters 1 and 2 glare at each other is displayed (s96).

Next, in step s98, the timing phrase points of microphones 1 and 2 are compared with each other. If the point of microphone 1 is higher than that of microphone 2, a character animation in which character 1 plays trick 3 (tripping-up trick or the like) corresponding to the timing point to character 2 is displayed (s99). By contrast, if the point of microphone 2 is higher than that of microphone 1, a character animation in which character 2 plays trick 3 corresponding to the timing point to character 1 is displayed (s101). In the case where the point of microphone 1 is substantially equal to that of microphone 2, the confronting character screen in which characters 1 and 2 glare at each other is displayed (s100).

At last, in step s102, the total phrase points of microphones 1 and 2 are compared with each other. If the point of microphone 1 is higher than that of microphone 2, a character animation in which character 1 plays trick 4 (throwing trick or the like) corresponding to the total point to character 2 is displayed (s103). By contrast, if the point of microphone 2 is higher than that of microphone 1, a character animation in which character 2 plays trick 4 corresponding to the total point to character 1 is displayed (s105). In the case where the point of microphone 1 is substantially equal to that of microphone 2, the confronting character screen in which characters 1 and 2 glare at each other is displayed (s104). While maintaining the animation for the total phrase points, the process returns to step s83 and waits until the next phrase points are input.

As described above, four tricks are played in one phrase of about 10 seconds, and hence the animation is extremely dynamic. It is sufficient to display the animation of each trick for two to three seconds. The screen waits in the last condition in which the trick based on the total phrase point is played, until the next phrase points are input. Consequently, an impression of the trick for the total phrase points is emphasized as compared with the other tricks, with the result that the weight of the total phrase points can be substantially increased.

If it is judged in step s84 that the karaoke music piece is finished, the screen of the battle on the background picture is switched to the result display screen shown in FIG. 12B (s85), and the process waits until the whole-piece total points are input (s86). When the total whole-piece points are input, the display control operation is terminated after the points are displayed as shown in the figure. Only the total points are used in the result display screen. Alternatively, also the other whole-piece points, i.e., the frequency whole-piece point, the volume whole-piece point, and the timing whole-piece point may be displayed. In the result display screen, the point throughout the whole music piece, i.e., the point which is the same as that in the usual scoring mode is displayed. Alternatively, the number of served tricks, or the like may be displayed.

In the above-described operation, the four tricks are played for each phrase based on the four kinds of phrase points. Alternatively, in the case where the screen display is complicated, one to three of the four kinds of points may be selected, and a trick or tricks are played based on the selected point or points. As for the selection, one and the same point may be selected throughout the music piece, or the selection may be changed for each phrase.

In the above-described operation, the order of the tricks is fixed or from the trick 1 to the trick 4. Alternatively, the order may be changed for each phrase. In this case, the tricks corresponding to the frequency, the volume, the timing, and the total phrase points may be changed. Alternatively, the display order (the order of tricks) may be changed while the correspondence relationship between the phrase points and the tricks is unchanged.

In the embodiment, the scoring is conducted with giving the same reference data to two singers, so that the two singers can battle in the same condition. In the case of a duet music piece of two parts, reference data of different parts may be given respectively, so that the singers can battle based on the score results of the respective parts.

In the embodiment, two microphones for singing, i.e., microphones 1 and 2 are used, but the number of microphones is not limited to two. The battle characters are used for displaying the superiority/inferiority of the singing voices input through the respective microphones, but the display manner is not limited to this.

According to the first aspect of the invention, when one karaoke music piece is being performed, singing voices are input at a time through a plurality of microphones for singing and the superiority/inferiority is displayed for each predetermined performance section in real time. Therefore, a plurality of singers can sing while they compete with each other, and the karaoke singing can bear the game characteristics, so that the singing emotion can be caused to upsurge.

According to the second aspect of the invention, the singing voice is scored for each of a plurality of factors, and the superiority/inferiority for each factor is displayed in different modes. Therefore, each singer can recognize what is superior and what is inferior in the singing to the other singer, based on the display.

According to the third aspect of the invention, when a voice signal is input through one of a plurality of microphones for singing, information indicating which microphone is used is displayed. Therefore, microphones cannot be mistakenly used in the case where the respective microphones are used for different parts, or in the case where the signals of the respective microphones are used for moving different characters.

According to the fourth aspect of the invention, the motion of an image such as a character displayed on the screen is controlled in accordance with the singing voice input through the microphone for singing. Therefore, the condition of the singing voice of the singer can be displayed as the motion of the image, and the singer can visually understand the manner in which the singer sings.

According to the fifth aspect of the invention, when one karaoke music piece is performed, singing voices are input at a time through a plurality of microphones for singing, and the motions of images displayed in a corresponding manner to the respective microphones for singing are controlled based on the score results. Therefore, the score results can be displayed not simply by the points, but in visually and intuitively understandable manner. Accordingly, the score results can be easily understood by the singers and the attendances, and the karaoke singing can bear the game characteristics, so that the singing emotion can be caused to upsurge.

What is claimed is:

1. A karaoke apparatus, comprising:
a performing device which is configured to perform a karaoke music piece;
a plurality of microphones for singing through which singing voices of individual singers are respectively input during a performance of the karaoke music piece;
a scoring device which is configured to individually score a plurality of singing voices input through the microphones, for each predetermined performance section of the karaoke music piece; and
a superiority/inferiority displaying device displaying which singing voice of a singer is superior during or immediately after a performance of the predetermined performance section, based on a score result of the scoring device, wherein:
the scoring device is configured to score a singing voice on each of a plurality of factors including a frequency, a volume, a rhythm, and a total, in which the total is a summation of said frequency, volume, and rhythm scores; and
the superiority/inferiority displaying device is adapted to display superiority/inferiority of the singing voice for each of the factors in the form, of an action taken by animated characters involved in a battle game.

2. A karaoke apparatus, comprising:
a plurality of microphones for singing;
a displaying device which is adapted to display evaluations of singing voices respectively input through the microphones in a performance of a karaoke music piece, with respectively predetermined characters adapted to engage in a battle game; and
a microphone identifying device which is adapted to receive a voice signal from one of the microphones before the performance of the karaoke music piece is started, and displays, through the displaying device, an identification indicative of the character to which the one microphone through which the voice signal is input corresponds.

3. A karaoke apparatus, comprising:
a performing device which is adapted to perform a karaoke music piece;
a microphone for singing, through which a singing voice of a singer is input during a performance of the karaoke music piece;
an image displaying device which is configured to display an image of a character with a motion during the performance of the karaoke music piece, wherein the character is adapted to engage in a battle game; and
a motion controlling device which is configured to control the motion of the image in accordance with a singing voice input through the microphone.

4. A karaoke apparatus, comprising:
a performing device which is adapted to perform a karaoke music piece;
a plurality of microphones for singing through which singing voices of individual singers are respectively input during a performance of the karaoke music piece;
an image displaying device which is configured to display a plurality of battle game characters with motions which respectively correspond to the microphones, during the performance of the karaoke music piece;
a scoring device which is configured to individually score a plurality of singing voices input through the microphones, for each predetermined performance section of the karaoke music piece; and
a motion controlling device which is configured to control a motion of at least one of the characters based on a score result of the scoring device.

5. A karaoke apparatus, comprising:
a plurality of microphones for singing;
a scoring device which is configured to individually score a plurality of singing voices input through the microphones, for each predetermined performance section of a karaoke music piece;
a displaying device which is adapted to display evaluations of the singing voices respectively input through the microphones in said performance of the karaoke music piece, with respectively predetermined characters adapted to engage in a match; and
a microphone identifying device which is adapted to receive a voice signal from one of the microphones before the performance of the karaoke music piece is started, and displays an identification indicative of the character to which the one microphone through which the voice signal is input corresponds.

6. A karaoke apparatus according to claim 5, wherein the displaying device is configured to display a plurality of said characters with motions which respectively correspond to the microphones, during the performance of the karaoke music piece, the apparatus further comprising a motion controlling device which is configured to control a motion of at least one of the characters based on a score result of the scoring device.

7. A karaoke apparatus which is configured to process music-piece data of a designated karaoke music piece to acoustically output a karaoke musical accompaniment, said karaoke apparatus comprising:
two microphones adapted for use by two singers;
a voice processing device configured to collect a voice signal to be input to each of said two microphones;
a scoring device configured to compare voice signals collected from said two microphones with reference data incidental to said music-piece data based on a predetermined algorithm and sequentially and individually calculate two points corresponding respectively to each of said two microphones based on said comparison in the process of performance of said musical accompaniment;

a martial-art animation producing device configured to produce a martial-art animation having two characters corresponding to said two singers, and change relative superiority in martial art between said characters in response to said two points input from said scoring device; and a display control device configured to display on a display said martial-art animation produced by said martial-art animation producing device.

8. A karaoke apparatus according to claim 7, wherein said voice processing device is configured to collect voice signals for a plurality of factors, said scoring device is configured to individually compare reference data corresponding to each of said plurality of factors with said factors in said voice signals to calculate said two points for every factor, and said martial-art animation producing device is configured to input said two points for each said factor from said scoring device and produce a martial-art animation in which each character is adapted to perform an animated martial-art trick corresponding to one of said factors.

9. A karaoke apparatus according to claim 8, wherein said martial-art animation producing device is adapted to produce an animation including an expression indicating a correspondence between one of said two characters and one of said two microphones once a voice signal is input to either of said two microphones at a time when a karaoke musical accompaniment is not performed.

* * * * *

UNITED STATES PATENT AND TRADEMARK OFFICE
CERTIFICATE OF CORRECTION

PATENT NO.   : 6,352,432 B1  Page 1 of 1
DATED        : March 5, 2002
INVENTOR(S)  : Tom Jen Tsai, Kanehisa Tsurumi, Satoshi Tachibana It is certified that error appears in the above-identified patent and that said Letters Patent is hereby corrected as shown below:

<u>Title page,</u>
Item [73], should read -- Assignees: Yamaha Corporation, Hamamatsu-shi (JP)
Kabushikikaisha Daiichikosho, Tokyo (JP) --

Signed and Sealed this

First Day of April, 2003

JAMES E. ROGAN
*Director of the United States Patent and Trademark Office*